United States Patent [19]

Kressdorf et al.

[11] Patent Number: 5,510,453
[45] Date of Patent: Apr. 23, 1996

[54] POLYMERIZABLE, HIGHLY CROSSLINKING LACQUER BINDERS AND THEIR USE FOR THE PRODUCTION OF LACQUERS

[75] Inventors: Burkhard Kressdorf, Walsrode; Erhard Lühmann, Bomlitz; Wolfgang Dannhorn, Fallingbostel; Lutz Hoppe, Walsrode, all of Germany

[73] Assignee: Wolff Walsrode Aktiengesellschaft, Walsrode, Germany

[21] Appl. No.: 418,927

[22] Filed: Apr. 7, 1995

Related U.S. Application Data

[63] Continuation of Ser. No. 75,206, Jun. 10, 1993, abandoned.

[30] Foreign Application Priority Data

Jun. 10, 1992 [DE] Germany .................. 42 19 768.6

[51] Int. Cl.$^6$ .................................................. C08G 63/52
[52] U.S. Cl. ..................... 528/306; 528/272; 528/297; 528/301; 528/303; 524/601; 524/608
[58] Field of Search ...................... 528/272, 297, 528/301, 303, 306; 524/601, 608

[56] References Cited

U.S. PATENT DOCUMENTS

| 2,884,394 | 4/1959 | Silver ........................... 524/604 |
| 3,673,138 | 6/1972 | Harris .......................... 528/77 |
| 4,673,758 | 6/1987 | Meixner et al. ............. 560/90 |
| 5,102,976 | 4/1992 | Kressdorf et al. ........... 528/272 |

FOREIGN PATENT DOCUMENTS

| 0182147 | 5/1986 | European Pat. Off. . |
| 0451588 | 10/1992 | European Pat. Off. . |
| 3218200 | 11/1983 | Germany . |

*Primary Examiner*—Samuel A. Acquah
*Attorney, Agent, or Firm*—William C. Gerstenzang; Sprung Horn Kramer & Woods

[57] ABSTRACT

The invention relates to novel branched polyesters containing allyl groups, which polyesters are water-emulsifiable, and their use as raw materials for lacquers.

9 Claims, No Drawings

POLYMERIZABLE, HIGHLY CROSSLINKING LACQUER BINDERS AND THEIR USE FOR THE PRODUCTION OF LACQUERS

This application is a Continuation of application Ser. No. 08/079,206, filed Jun. 10, 1993, now abandon.

This invention relates to novel branched polyesters containing allyl groups, which polyesters are water-emulsifiable, and their use as raw materials for lacquers.

Lacquer formulations which may be applied without organic solvents are attracting increasing interest due to ever stricter environmental protection requirements. In order to adjust the working viscosity of such binders to the desired value, it is generally necessary to add either reactive thinners or water. However, reactive thinners, such as styrene, acrylates and methacrylates, are often physiologically highly questionable. They may cause skin irritation and burns to the eyes. Moreover, the proportion of reactive thinner, which varies depending on the selected viscosity, sometimes considerably influences the lacquer properties. These disadvantages may be avoided by the use of water as thinner (see *Farbe+Lack*, 98, 165 (1992)).

Water-emulsifiable, polymerisable polyesters based on mono- and difunctional hydroxyl components are known from DE-OS 3 441 154, DE-OS 2 905 666, DE-OS 2 804 216 and DE-OS 3 218 200. The polyesters may be cured with polymerisation initiators or UV radiation, but the curing times are too long for industrial applications, for example furniture lacquering. Moreover, the binders penetrate deeply into wood and display insufficient hardness after curing. The low reactivity of unsaturated polyesters is known.

It has proved possible to obtain products with higher curing rates with modified, unsaturated polyesters. In DE-OS 3 935 495, by way of example, a linear unsaturated polyester is reacted with isocyanate. A product of higher viscosity and shorter curing time is produced by the reaction. The products must, however, be thinned to the working viscosity with organic solvents; this requires the use of costly exhaust air afterburning plants.

Furthermore, the polyisocyanates necessary for the synthesis are toxicologically highly questionable. Even at very low concentrations, isocyanates are highly irritant to the skin, mucous membranes, eyes and respiratory passages. Another disadvantage of these polyester polyurethanes is their costly production via a two-stage process. Isocyanate-modified, water-emulsifiable polyesters are described in DE-OS 4 011 349. The problems with toxic isocyanates and costly production arise in this case too.

Radiation-curable branched binders are described in DE-OS 4 011 353, which are applied from aqueous solutions. The following disadvantages compared with aqueous emulsions result from this:

1. for the same binder content, viscosity is substantially higher.
2. after application water is released slowly.
3. The organic binder is less effectively removed from residues of the formulation by flocculation (effluent purification!).
4. The lacquers are very soft due to the high polyether content and
5. may not therefore be sanded.

Such products are not suitable for high quality coatings which are subjected to high mechanical demands.

It was the object of the present work to produce a water-dispersible polymerisable binder which does not irritate the skin, which may be cured both with peroxide and UV light, does not exhibit the above disadvantages and, after curing, exhibits good properties, particularly good hardness, adhesive strength, solvent resistance and reduced wood penetration.

Surprisingly, it was possible to achieve this object by the synthesis of branched, unsaturated polyesters. It is characteristic of the unsaturated polyesters according to the invention that branching is achieved by the incorporation of polyols, preferably of non-alkoxylated polyols.

The present invention provides unsaturated polyesters based on at least one alcohol containing allyloxy groupings and at least one triol and/or polyols with more than 3 OH groups. Non-alkoxylated polyols are preferred. The binders according to the invention are obtained by polycondensation of the following components:

A. one or more polycarboxylic acids and/or, if accessible, the anhydrides thereof, in particular $\alpha,\beta$-ethylenically unsaturated polycarboxylic acids, B. an allyl ether containing at least one hydroxyl group, C. one or more dihydric alcohols, at least one of which is a polyalkylene glycol, preferably with a molar mass of 400 to 2000 g/mol, D. optionally one or more monohydric alcohols, to adjust the molar mass, E. one or more polyols which are at least trihydric, preferably those which are not alkoxylated.

The polycarboxylic acids A, or anhydrides of polycarboxylic acids A concerned are dicarboxylic acids, such as for example malonic acid, succinic acid, glutaric acid, adipic acid, phthalic acid, terephthalic acid and isophthalic acid, preferably unsaturated dicarboxylic acids, anhydrides of dicarboxylic acids are particularly preferred. The unsaturated dicarboxylic acids or dicarboxylic anhydrides which come into consideration for the production of the polyesters according to the invention are maleic acid, chloromaleic acid, fumaric acid, citraconic acid, itaconic acid, mesaconic acid or, if accessible, the anhydrides thereof, preferably maleic anhydride and fumaric anhydride, particularly preferably maleic anhydride. Incorporation of, for example, hexachloroendomethylenetetrahydrophthalic acid, tetrachlorophthalic acid or tetrabromophthalic acid provides low-flammability resins. Hydroxycarboxylic acids may also be used. Examples of this are 2-hydroxyacetic acid, 3-hydroxypropanoic acid, 4-hydroxybutyric acid, 5-hydroxypentanoic acid, 6-hydroxyhexanoic acid or 10-hydroxydecanoic acid.

Suitable components B are, for example, allyl, methallyl ethallyl, chloroallyl ethers, such as oxethylated or oxpropylated allyl, methallyl, ethallyl or chloroallyl alcohol, glycerol mono or diallyl ether, trimethylolethane mono or dimethallyl ether, trimethylolpropane mono or diallyl ether, 1,3,5-hexanetriol mono or dichloroallyl ether, pentaerythritol mono, di or triallyl ether, tetramethylolcyclohexanol tetraallyl ether, butene-2,3-diol-1,4-monoallyl ether, mixed ethers, such as trimethylolpropane monoallyl monocrotyl ether and pentaerythritol mono or diallyl monobenzyl ether. Trimethylolpropane mono and diallyl ether are particularly preferred.

Suitable dihydric alcohols C are ethylene glycol, 1,2-propanediol, 1,3-propanediol, diethylene glycol, dipropylene glycol, 1,3-butanediol, 1,4-butane diol, neopentyl glycol, 1,6-hexanediol, bis-oxalkylated bisphenol A, perhydrobisphenol A, 1,4-cyclohexanedimethanol, 2,2-dichloromethylpropane-1,3-diol, 2,2,4-trimethyl-pentane-1,3-diol, poly-(tetrahydrofuran)-diol, 1,4-bis-(hydroxy-methyl)-cyclohexane, tricyclodecanedimethanol, diethanolamine, 2,2-bis-(hydroxy-methyl)-propionic acid together with polyalkylene glycols such as polyethylene glycols and polypropylene glycols. Polyethylene glycols are preferred.

In order better to adjust the molar mass or modify properties, particularly dispersion or solubility properties, monohydric alcohols D, such as methanol, ethanol, butanol, pentanol, heptanol, iso-octanol, allyl alcohol, alkoxylated allyl alcohols, benzyl alcohol, all hexanols, octanols and decanols, cetyl alcohols, hexahydrobenzyl alcohols, β-phenyl ethanol and polyalkylene glycol alkyl ethers such as diethylene glycol monobutylether may be used. Also suitable are hydroxysulphonic acids, such as for example 2-hydroxyethanesulphonic acid, 3-hydroxypropanesulphonic acid, 4-hydroxybutanesulphonic acid, all phenolsulphonic acids, additionally all naphtholsulphonic acids.

Preferred, greater than dihydric polyols E are tri to hexahydric, non-oxalkylated, aliphatic alcohols. The following are stated by way of example: glycerol, trimethylolpropane, trimethylolethane, pentaerythritol, erythritolsorbitol, di-trimethylolpropane and di-pentaerythritol, particularly preferred are glycerol and trimethylolpropane. Oxalkylated alcohols may also optionally be used. Oxalkylated alcohols are understood to be oxethylated and/or oxpropylated tri to hexahydric aliphatic alcohols. The parent substances for the polyols are tri to hexahydric aliphatic alcohols, for example glycerol, trimethylolpropane, trimethylolethane, pentaerythritol, erythritolsorbitol, triethanolamine, di-trimethylolpropane and di-pentaerythritol.

In a particularly preferred embodiment, components A to E are used in the following molar ratios:

| | |
|---|---|
| polycarboxylic acid A: | 0.8 to 1.2 mol, |
| in particular | 0.9 to 1.1 mol, |
| allylether B: | 0.4 to 0.8 mol, |
| in particular | 0.5 to 0.7 mol, |
| alcohols C: | 0.2 to 0.8 mol, |
| in particular | 0.3 to 0.7 mol, |
| alcohols D: | 0.0 to 0.6 mol, |
| in particular | 0.3 to 0.5 mol, |
| polyols E: | 0 to 0.2 mol, |
| in particular | 0.01 to 0.1 mol. |

Production of the polyesters may proceed according to known methods, for example by melt or azeotropic esterification of the alcohols and acids or the esterifiable derivatives thereof, for example the anhydrides thereof (c.f. *Methoden der organischen Chemie*, Houben-Weyl, 4th edition, volume 14/2, Georg Thieme Verlag, Stuttgart, 1961). Melt condensation under a vacuum at temperatures of 140° to 200° C., preferably 150° to 180° C., is preferred.

In order to avoid undesirable, premature polymerisation, polymerisation inhibitors and/or antioxidants may be added to the polyesters as early as during their production. Suitable stabilisers are described in *Methoden der organischen Chemic*, Houben-Weyl, 4th edition, volume 14/1, page 433, Georg Thieme Verlag, Stuttgart, 1961.

The compounds concerned are those customarily used to inhibit thermal polymerisation, for example phenols and phenol derivatives, preferably sterically hindered phenols, such as 2,6-di-tert.-butylphenol, amines, nitrosamines, quinones, hydroquinonemonoalkyl ethers, phenothiazines or phosphites. They are generally used in quantities of 0.001 to 3.0 wt. %, preferably in quantities of 0.005 to 0.5 wt. %, Toluhydroquinone in a concentration of 0.01 to 0.05 wt. % is very suitable.

Polycondensation is terminated at a polyester acid value of 1 to 50, preferably 10 to 30 mg KOH per gram of polyester.

The products obtained are emulsifiable in water without the addition of emulsifiers or other auxiliary substances and are characterised by good lacquer properties after curing. If desired, the binders may be neutralised with ammonia, so giving limpid liquids. In comparison with water-soluble polyesters corresponding to the prior art, the polyester lacquers according to the invention cure more quickly and have higher surface hardness (measured as pendulum hardness).

Particularly high quality lacquer coatings may be achieved by reacting the polyesters according to the invention with polyisocyanates. The polyester urethanes obtained were then converted into aqueous emulsions. Noticeable changes in properties, such as for example improvement of adhesive strength, may be observed with levels of isocyanate addition as low as 0.1 wt. %.

Furthermore, in order to achieve particular technical effects, extenders, pigments, dyes, thixotropic agents, smoothing agents, flatting agents and flow-control agents etc. may be added to the lacquer binders described in customary quantities.

The lacquer binders may be thinned not only with water, but they may also, if desired, be dissolved in organic solvents. Moreover, the polyesters according to the invention are compatible with other UV binders, such as for example polyester acrylates, polyurethane acrylates, epoxy acrylates, reactive thinners etc. Such mixtures may also be emulsified with water, possibly with the addition of alkalis. Suitable modes of application are spraying, rolling, knife coating, pouring, brushing and dipping.

The binders according to the invention may be polymerised after evaporation of the water, wherein lacquer layers are obtained with favourable surface properties, preferably on wood, but also on plastics and metals. Polymerisation may proceed thermally and/or by the addition of polymerisation initiators (for example radical formers), but also by high-energy radiation (UV, electron, X-ray or gamma radiation, wherein photoinitiators may be added), UV curing is particularly preferred. Suitable photoinitiators are those compounds known for radiation curing, e.g. aromatic ketone compounds, benzophenones, alkylbenzophenones, Michler's ketone, Antron and halogenated benzophenones. Also suitable are 2,4,6-trimethylbenzoyl-diphenylphosphine oxide, phenylglyoxylic acid ester, anthraquinone and its many derivatives, particularly benzoin and its derivatives, additionally benzil ketals and hydroxyalkylphenones. Examples of suitable initiators are described in DE-OS 1 769 168, DE-OS 1 769 853, DE-OS 1 769 854, DE-OS 1 807 297, DE-OS 1 807 301, DE-OS 1 919 678 and DE-AS 1 694 143. Mixtures of these compounds may also be used.

Curing may also proceed with polymerisation initiating radical formers. Water soluble peroxides are preferred, such as hydrogen peroxide and acetylacetone peroxide, additionally methyl ethyl ketone hydroperoxide, cyclohexanone peroxide or aqueous emulsions of non water-soluble initiators.

These radical formers may be combined in a known manner with accelerators, such as for example heavy metal salts of carboxylic acids, chelates of these metals, such as the acetates, naphthenates or acetylacetonates of cobalt, manganese or vanadium. The accelerators may also be used either in the form of an aqueous solution, if they are water-soluble, or otherwise as aqueous emulsions.

PRODUCTION OF THE POLYESTERS AND THE CORRESPONDING EMULSIONS THEREOF

The initial components listed in the following table were subjected to melt polycondensation under a vacuum at 160° to 180° C. The reaction was continued until the stated acid value was reached. In all examples, the reaction was performed in the presence of 0.05 wt. % of toluhydroquinone.

Water was stirred into the binder using a dissolver to produce the dispersion. Solids content was adjusted to 50%.

TESTING OF LACQUER BINDER

After addition of 1.5 wt. % of 2-hydroxy-2-methyl-1-phenylpropane-1-one to the emulsions, samples were applied to glass sheets with a knife coater to a film thickness of 90μ, dried and exposed to UV light (80 W/cm). König pendulum hardness was then determined (DIN 53 157) (see table 1).

The binders were applied in the same manner to sheets of wood, but with a film thickness of 120μ. After drying and curing, the quality of the lacquers according to the invention was evaluated. The films are characterised by very good flow and low penetration into wood. They are transparent, elastic and very scratch resistant. The surfaces have no craters.

COMPARATIVE EXAMPLE

As a comparative example, a polyester was produced corresponding to example 4 of DE-OS 3 441 154. Unlike the polyester according to the invention, no tri or tetrafunctional alcohol was used. The product obtained penetrates deeply into the wood substrate and has only low pendulum hardness (see table 1).

TABLE 1

| Composition (mol) | Examples | | | | | Comparative example |
|---|---|---|---|---|---|---|
| | 1 | 2 | 3 | 4 | 5 | |
| Polyethylene glycol 1500 | 0.03 | 0.03 | 0.03 | 0.03 | 0.03 | 0.04 |
| 1,2-propanediol | 0.27 | 0.41 | 0.55 | 0.47 | 0.55 | 0.53 |
| Benzyl alcohol | 0.40 | 0.40 | 0.40 | 0.40 | 0.40 | 0.40 |
| Trimethylolpropane | — | — | 0.04 | 0.10 | — | — |
| Pentaerythritol | — | — | — | — | 0.04 | — |
| Glycerol | 0.18 | 0.10 | — | — | — | — |
| Trimethylolpropane diallyl ether | 0.60 | 0.60 | 0.60 | 0.60 | 0.60 | 0.60 |
| Maleic anhydride | 1.00 | 1.00 | 1.00 | 1.00 | 1.00 | 1.00 |
| Acid value (mg KOH/g) | 23 | 21 | 19 | 20 | 21 | 21 |
| Pendulum hardness to DIN 53 157 90μ on glass (s) | 101 | 98 | 88 | 97 | 95 | 57 |
| Flow | very good | very good | very good | very good | very good | satisfactory |
| Behaviour on wood | Lacquer films with no craters, little penetration into substrate | | | | | Deep penetration into wood substrate |

We claim:

1. Self-emulsifiable, polymerizable, branched polyester comprising co-condensed units of (A) an α,β-unsaturated polycarboxylic acid or anhydride thereof, (B) a hydroxyl compound containing at least one allyl group, (C) polyethylene glycol, polypropylene glycol or both and optionally (D) more than one monohydric alcohol, wherein the polyester contains (E) cocondensed units of at least one triol or tetra to hexahydric polyol as branch points.

2. A polyester according to claim 1, wherein A comprises at least one of maleic and fumaric acids.

3. A polyester according to claim 1, wherein B comprises at least one of trimethylolpropane monoallyl ether and trimethylolpropane diallyl ether.

4. The polyester of claim 1 wherein the alcohols (c) are propane 1,2-diol and polyethylene glycol 1500.

5. A polyester according to claim 4, wherein C has a molar weight of 400 to 2000.

6. A polyester according to claim 1, wherein units of the monohydric alcohol D are present and D has a boiling point above 190° C.

7. A polyester according to claim 6, where D comprises at least one of benzyl alcohol, β-phenyl ethanol, 1-decanol and diethylenglycol monobutyl ether.

8. A polyester according to claim 1, wherein E comprises at least one of glycerol, trimethylolpropane and pentaerythritol.

9. A polyester according to claim 1, comprising 0.8 to 1.2 molar units of A,
0.4 to 0.8 molar units of B,
0.2 to 0.8 molar units of C,
0.0 to 0.6 molar units of D, and
0.01 to 0.2 molar units of E.

* * * * *

UNITED STATES PATENT AND TRADEMARK OFFICE
CERTIFICATE OF CORRECTION

PATENT NO. : 5,510,453
DATED : April 23, 1996
INVENTOR(S) : Kressdorf, et al.

It is certified that error appears in the above-indentified patent and that said Letters Patent is hereby corrected as shown below:

Title page, item [30], Foreign Application Priority Data: After " Jun. " delete " 10 " and substitute -- 17 --

Signed and Sealed this

Twenty-ninth Day of October 1996

Attest:

BRUCE LEHMAN

Attesting Officer     Commissioner of Patents and Trademarks